350-376 SR

XR 3,284,785

[redacted] UX

CROSS REFERENCE

Nov. 8, 1966 O. KORNEI 3,284,785

MAGNETO-OPTIC READOUT DETECTOR

Filed July 16, 1963 2 Sheets-Sheet 1

INVENTOR.
OTTO KORNEI

BY George E. Roush
ATTORNEY

3284785
OR IN 360/114

Nov. 8, 1966 O. KORNEI 3,284,785

MAGNETO-OPTIC READOUT DETECTOR

Filed July 16, 1963 2 Sheets-Sheet 2

United States Patent Office 3,284,785
Patented Nov. 8, 1966

3,284,785
MAGNETO-OPTIC READOUT DETECTOR

Otto Kornei, Monte Sereno, Calif., assignor to International Business Machines Corporation, New York, N.Y., a corporation of New York Filed July 16, 1963, Ser. No. 295,439
6 Claims. (Cl. 340—174.1)

The invention relates to methods and means for reproducing information stored by a magnetic record, and it particularly pertains to the retrieving of recorded information by projecting a beam of polarized light onto and reflecting it from the recording surface.

As a beam of polarized light is reflected from a magnetized surface, the polarization is altered in a manner that may be regarded, in approximation, as a rotation of the plane of polarization. The amount of rotation is proportional to the magnetization of the surface, and the direction of rotation is dependent upon the direction of the magnetization. This effect is known as the magneto-optic "Kerr effect." Thus, binary digits or "bits," recorded on a magnetizable surface by a conventional electromagnetic transducer, or other means, may readily be recognized by directing light through a first light polarizing element—termed the "polarizer"—onto the magnetized surface, and passing the reflected light beam through a second light polarizing element—termed the "analyzer"—that is oriented relative to the polarizer to pass a predetermined optimum amount of light when the beam is reflected from the surface in a non-magnetized state. Any magnetic record existing on the recording surface may then be interpreted by observing the light transmitted through the analyzer. The areas may appear darker or lighter, depending upon the positive or negative direction of the recording current and upon the setting of the quiescent amount of light passing through the polarizing means at zero magnetization. By directing the light transmitted by the analyzer onto a photosensitive element, and moving the recording surface relative to the reading beam, any data recorded on the surface may be retrieved as a series of electric signals of a configuration corresponding to the waveform of the initial recording current. Thus, by appropriately orienting the two polarizing elements relative to each other, the positive state of magnetization representing, for instance, the storage of "one" bits of the binary code, can be made to correspond to a state of greater light transmission of the analyzer, and the negative state of magnetization representing the storage of "zero" bits of the binary code can be made to correspond to a state of lesser light transmission of the analyzer.

There is a special case in which polarizer and analyzer are displaced at exactly 90°; the transmitted, quiescent light is then zero, or near-zero. In this case magnetized areas of either polarity (but equal magnetization) will appear with equal brightness since the transmitted light then depends upon the angle of optical rotation only but not upon the direction of rotation. This is more clearly illustrated in FIG. 2 which shows the light transmission I of the system polarizer-Kerr rotator-analyzer as a function of the angle of Kerr rotation $\phi$. In this figure $+\phi_0$ and $-\phi_0$ denote, for instance, the amounts of positive and negative Kerr rotation imparted to the polarized light beam by the positive and negative magnetizations of two areas on the information track. It can be seen that both rotations result in the same light intensity, because of the symmetry of the transfer curve.

The degree of rotation imparted to the plane of polarization of a polarized beam of light when it is reflected from a magnetized surface is usually very small, being of the order of considerably less than one degree and ordinarily no larger than several minutes of arc.

This limitation, together with practical limitations in the intensity of surface illumination, the uniformity of the magnetic recording surfaces, and the intrinsic noise generated in the necessary high-gain wide band signal amplifiers, results in rather low signal-to-noise ratios in practical readout systems.

The object of the invention is to improve the signal-to-nose ratio of magneto-optic Kerr effect readout systems.

According to the invention, magnetically recorded information reproduced by the magneto-optic Kerr effect is detected by a carrier phase shift rather than by amplitude differences as in the conventional methods.

Accordingly, the conventional polarizer and analyzer are preferably adjusted at an angle of 90° with respect to one another so that the quiescent light, that is, that light transmitted from a non-magnetized surface area, is zero or near-zero. Either positive or negative magnetization of equal magnitude, giving rise to rotations of plus or minus $\phi_0$ will then cause a light flux of intensity $I_0$ to appear. Means are now interposed anywhere between polarizer and analyzer, which permit to superimpose a periodic rotation of the plane of polarization; the amplitude of this rotation $\Delta\phi$ should be equal to, or less than, the rotation $\phi_0$ caused by the magnetized areas. See FIG. 1. Thus, an alternating light flux will then be obtained from each of the positively and the negatively magnetized areas. The average intensities of these light fluxes will be the same but their intensity variations will be in 180° phase opposition, varying between the extremes of $I_{max}$ and $I_{min}$. The detection of the boundaries between oppositely magnetized areas or bits is thus reduced to the detection of 180° phase jumps of an alternating signal. The light is directed onto a photosensitive device and is there converted to electric signals of periodic waveform of either 0° or 180° relative phase. Such signals are applied to a phase detector at the ouput of which emerges a signal pulse train corresponding to the information recorded in digital form on the magnetic recording medium. Since the system described depends on phase detection and is relatively insensitive to amplitude variations, a large signal-to-noise ratio results.

In order that the full advantage of the invention may obtain in the practice thereof, a preferred embodiment of the invention, given by way of example only, is described hereinafter with reference to the accompanying drawing, forming a part of the specification, and in which.

Figure 1:
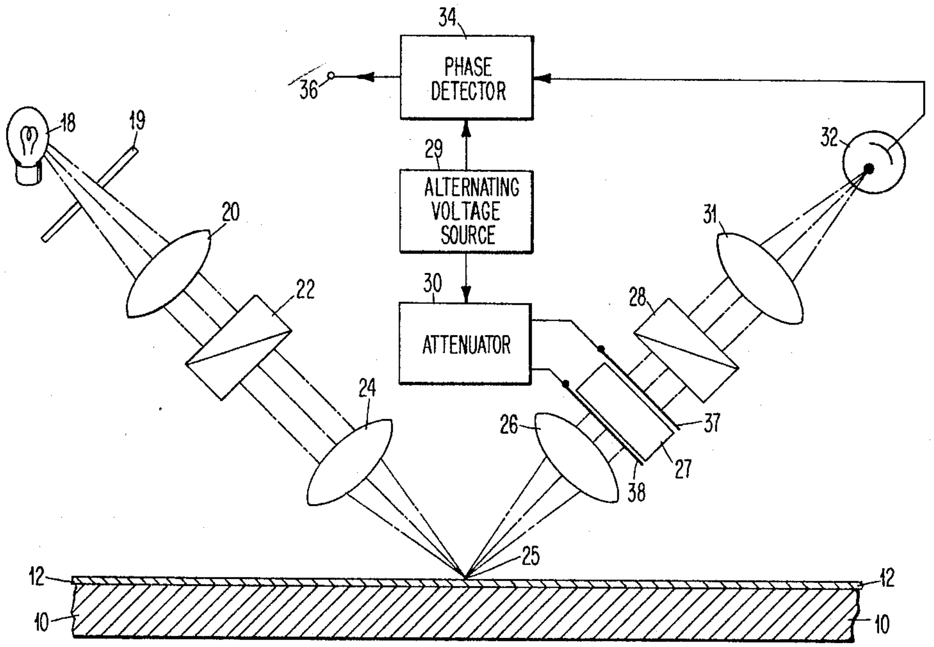
FIG. 1 is a schematic diagram of a magneto-optic Kerr effect information reproducing system according to the invention.

In the practice of the invention any magnetic recording medium having a suitable specular reflectivity may be used. The magnetic storage element illustrated in FIG. 1 may be a portion of a tape, a disk, or a drum, or whatever other form such elements may assume in the future. Light from a suitable source shown schematically as a lamp 18, but which may be a continuous gas laser, is passed through a mask 19, gathered by an optical system shown schematically as a simple lens 20 and transmitted through a plane polarizer 22. The polarized light beam emerging from the polarizer 22 is focused by another optical system shown schematically as a simple lens 24 onto a point 25 of the reflective magnetizable metal film 12 of the storage medium. At this point the plane of polarization remains either unchanged or is rotated in one or the other direction, depending upon whether the particular area of the film 12 under examination at the moment is magnetized and, if so, in which direction. The light reflected from the area about the point 25 is gathered by another optical system, represented schematically by a simple lens 26, and directed through a device 27 for periodically rotating the plane of polarization through analyzer 28, lens 31 onto the photosensitive detector 32.

The reflected polarized light is caused to rotate slightly and periodically, in addition to the Kerr rotation, by exciting the periodic rotator 27 with a periodic voltage from a suitable source 29. It should be noted that the periodic rotator 27 could just as well be interposed in the incident beam, for instance, between the lens 24 and the magnetized area about the point 25 should this be desirable.

Thus, a periodic change in the intensity of the light reaching the photosensitive detector 32 will take place, in accordance with the magnetization of the reflecting areas and the superimposed, periodic rotation caused by rotator 27. Either a positively or negatively magnetized area will, therefore, yield a periodically varying flux of light. The average intensities of the two fluxes will be about equal, but their phases—and those of any derived electric signals—will be opposed, that is, displaced by 180°. The detection of the boundaries between oppositely magnetized areas or bits is thus reduced to the detection of a 180° phase change of an alternating signal. Such a process yields far higher signal-to-noise ratios than does the detection of small intensity differences.

The required periodic rotation of the plane of polarization may be obtained by any of the known effects in optically active materials susceptible to either the influence of an electrical or magnetic field or of mechanical stress. Thus, the Faraday effect, the electro-optical Kerr effect, the electrically induced birefringence or the optical changes occurring in a vibrating crystal may be utilized. In a preferred embodiment of the invention a crystal which becomes birefringent in an electric field, such as ADP (ammonium dihydrogen phosphate) or KDP (potassium dihydrogen phosphate) is used. These crystals will, effectively, bring about a rotation of the plane of polarization of a beam of polarized light when a voltage is applied to them in the proper manner. Thus, in FIG. 1 the crystal 27 is subjected to an alternating electric field established between two transparent conductive surface electrodes 37, 38. Because the needed rotation is small, only low driving fields will be required. This is advantageous in the arrangement of the invention because the frequencies of the driving voltages, which should be of the order of ten times the bit frequency, may be quite high, in the order of several megacycles per second.

Figure 2:
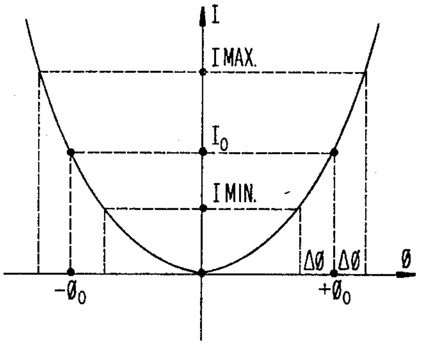
FIG. 2 is a transfer curve showing the dependence of transmitted light upon the angle between polarizer and analyzer (90° displacement denoted as $\phi$=zero degrees)
Figure 3:
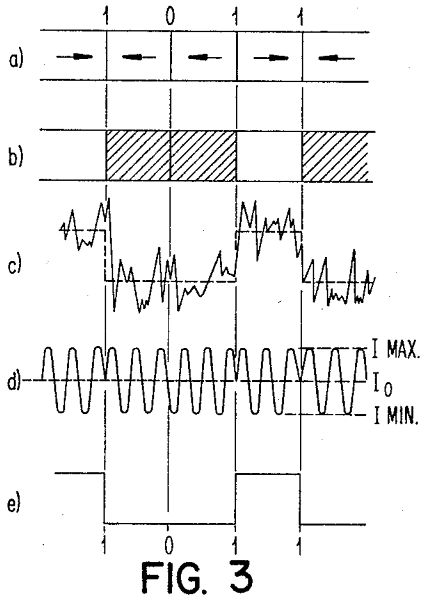
FIG. 3 is a graphical representation of record member magnetization and resulting waveforms.

The graphical representation in FIG. 3 is useful for a clearer understanding of the difference between the conventional approach to magneto-optic readout and the approach in accordance with the invention. The diagram at FIG. 3(*a*) represents a portion of a magnetic memory track with positively and negatively magnetized sections whose adjoining boundaries denote, in the conventional NRZI code, the recorded bits of information. In the chosen example the sequence of these bits is 1011. In accordance with the conventional Kerr readout process, the oppositely magnetized areas would then appear to the eye (or to any photo-electrical sensor) bright and dim, respectively, as shown in FIG. 3(*b*). Under ideal, noise-free conditions the output from the sensor would be as shown in the dotted line at FIG. 3(*c*). Under actual operating conditions the entire system-generated noise will be superimposed upon this signal to generate the solid, jagged line in the figure. It is clear that this noise will jeopardize a reliable readout. Using now the idea of the invention of superimposing a periodic variation of the light polarization upon the reading light beam, a light intensity output (and corresponding sensor output) shown in FIG. 3(*d*) will result. It can be seen that this output consists of an alternating signal of constant frequency, alternating about a quiescent level $I_0$, with positive and negative peak values of $I_{max}$ and $I_{min}$, respectively. The meaning of these notations was explained hereinbefore, with reference to FIG. 2. It will further be noted that the phase of the alternating signal undergoes a phase jump of 180° at each change of record magnetization. The detection of this phase change, of course, is not entirely independent of noise but is far less susceptible to it. Because the detector 34 discriminates substantially in phase only, amplitude variations will pose only minor problems and the wave at the output terminal 36' will be substantially as shown at FIG. 3(*e*).

Figure 4:
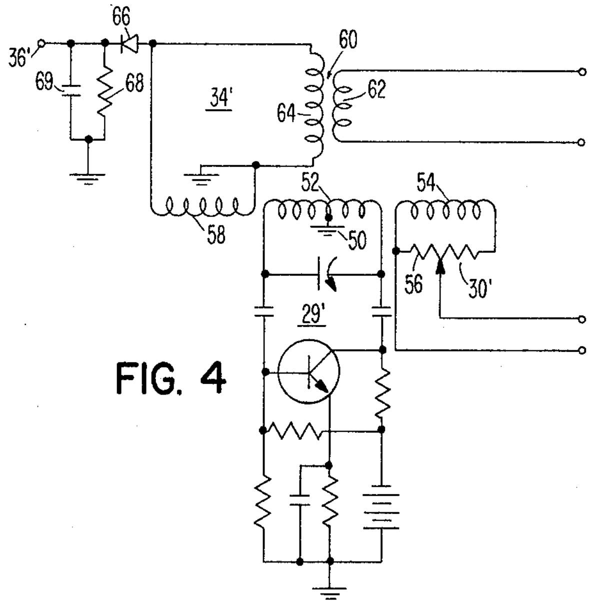
FIG. 4 is a schematic diagram of a form of alternating voltage generator, attenuator, and phase detector for use according to the invention.

FIG. 4 is a schematic diagram of an alternating voltage source 29', an attenuator 30', and a phase detector 34' suitable for embodiment of the invention. The source 29' is a transistor oscillator of the Hartley type. Oscillations in a resonant circuit 50, of a frequency several times the bit frequency, are induced in an output winding 54 for application through an attenuator protentiometer 56 to the periodic rotator 27. A reference voltage wave for the detector 34 is obtained by means of another output winding 58. The output wave from the photosensitive device 32 is applied, through amplifiers if necessary, to an input transformer 60 by way of a primary winding 62. This reference voltage is algebraically combined with the photodetector output in the secondary winding 64 of the transformer 60. The combined voltage wave is rectified by a diode 66' and an output voltage is developed across a load resistor 68 shunted by a smoothing capacitor 69. Thus, an NRZI fluctuating current signal is presented across the terminal 36' for application to an amplifier or other data translating apparatus.

Thus, as the information storage is passed undereneath the described magneto-optical information-retrieving apparatus and consecutive points of an information storage track thereof are searched by the periodically rotating polarized light beam of the apparatus of the invention, signals indicating the presence and the nature of magnetic information bits are produced by the phase detector and may be employed to indicate the presence and character of these bits visually or audibly, or to control the operation of subsequent machinery such as computers or accounting machines in a manner peculier to the nature of the information recorded on the recording element.

While the invention has been illustrated and described with reference to a preferred embodiment thereof, it should be understood that those skilled in the art will make changes in form and details, without departing from the spirit and scope of the invention.

The invention claimed is:

1. Magnetic record reproducing apparatus comprising,
   a specularly reflective magnetic record having discrete magnetized areas thereon representative of digital information,
   means for beaming light onto said magnetic record,
   means for moving said magnetic record with respect to said light beam whereby said discrete magnetized areas pass by the point of impingement of said light beam upon said record,
light polarizing means interposed in the path of said impinging light,
a photoresponsive device arranged to receive light reflected from said discrete areas,
light analyzing means interposed in the path of said reflected light,
means interposed in the path of said light between said polarizer and said analyzer for imparting periodic rotation to the polarization of said light beam, and
phase detecting means coupled to said photoresponsive device for producing an electric output signal corresponding to the magnetization of said discrete magnetized areas as they pass beneath said point of impingement of said light beam.

2. Magnetic record reproducing apparatus comprising,
a specularly reflective magnetic record having discrete magnetized areas thereon representative of digital information,
continuous gas laster means for beaming light onto said magnetic record,
means for moving said magnetic record with respect to said light beam whereby said discrete magnetized areas pass by the point of impingement of said light beam upon said record,
light polarizing means interposed in the path of said impinging light beam,
light analyzing means interposed in the path of the reflected light beam,
means interposed in the path of said light beam between said polarizer and said analyzer for imparting periodic positive and negative rotation of the plane of polarization of said light beam,
a photoresponsive device arranged to receive light reflected from said discrete areas, and
phase detecting means coupled to said photoresponsive device for producing an electric output signal corresponding to the magnetization of said discrete magnetized areas as they pass beneath said point of impingement of said light beam.

3. Magnetic record reproducing apparatus comprising,
a magnetic record having discrete magnetized areas thereon representative of digital information,
means for beaming light onto said magnetic record,
means for moving said magnetic record with respect to said light beam whereby said discrete magnetized areas pass by the point of impingement of said light beam upon said record,
light polarizing means interposed in the path of said impinging light beam,
light analyzing means interposed in said path of said reflected light,
means interposed in the path of said light between said polarizer and said analyzer for imparting periodic rotation of the plane of polarization of said light beam,
the angular magnitude of said periodic rotation not exceeding the rotation imparted to the light beam by said reflection from said magnetized areas,
a photoresponsive device arranged to receive light reflected from said discrete areas, and
phase detecting means coupled to said photoresponsive device for producing an electric output signal corresponding to the magnetization of said discrete magnetized areas as they pass beneath said point of impingement of said light beam.

4. Magnetic record reproducing apparatus comprising,
a magnetic record having discrete magnetized areas thereon representative of digital information,
means for beaming light onto said magnetic record,
means for moving said magnetic record with respect to said light beam whereby said discrete magnetized areas pass by the point of impingement of said light on said record,
light polarizing means interposed in the path of said light,
light analyzing means interposed in said path of said reflected light,
means interposed in the path of said light between said polarizer and said analyzer for imparting periodic rotation of plane of polarization of said light,
the frequency of said periodic rotation being several times the rate at which said magnetized areas pass said point of impingement of said light beam on said record,
a photoresponsive device arranged to receive light reflected from said discrete areas, and
phase detecting means coupled to said photoresponsive device for producing an electric output signal corresponding to the magnetization of said discrete magnetized areas as they pass beneath said point of impingement.

5. Magnetic record reproducing apparatus comprising,
a magnetic record having discrete magnetized areas thereon representative of digital information,
a beam of light directed onto said magnetic record at one of said discrete magnetized areas,
means for moving said record with respect to the point of impingement of said beam of light,
light polarizing means interposed in the path of the light directed onto said area,
a photoresponsive device arranged to receive light reflected from said area,
light analyzing means interposed in said path of said reflected light,
electro-optically active means interposed in the path of said light beam between said polarizer and said analyzer arranged for imparting periodic rotation of the plane of polarization of said light in response to applied alternating voltage,
a source of alternating voltage connected to said electro-optically active means for rotating the plane of polarization of said light beam, and
a phase detecting circuit coupled to said photoresponsive device for producing an output corresponding to the direction of magnetization of said one area.

6. Magnetic record reproducing apparatus comprising,
a magnetic record having discrete magnetized areas thereon representative of binary information,
a continuous gas laser for beaming light onto said magnetic record,
means for moving said magnetic record with respect to said light beam whereby said discrete magnetized areas pass by the point of impingement of said light beam upon said record,
light polarizing means interposed in the path of said impinging light beam,
a photoresponsive device arranged to receive light reflected from said discrete areas,
light analyzing means interposed in said path of said reflected light,
means interposed in the path of said light between said polarizer and said analyzer for imparting periodic positive and negative rotation of the plane of polarization of said light beam,
the magnitude of said periodic rotation not exceeding the rotation imparted to the light beam by said reflection from said magnetized areas,
the frequency of said period rotation being several times the rate at which said magnetized areas pass said point of impingement of said light beam on said record, and
phase detecting means coupled to said photoresponsive device for producing an electric output signal corresponding to the magnetization of said discrete magnetized areas as they pass beneath said point of impingement of said light beam.

(References on following page)

References Cited by the Examiner

UNITED STATES PATENTS 3,167,751 1/1965 Kelner et al. -------- 179—100.2

OTHER REFERENCES

Fan et al.: "Analysis of A Magneto-Optic Readout System," February 1963, pp. 3–9, IEEE Transactions on Electronic Computers.

References Cited by the Applicant

UNITED STATES PATENTS 3,228,015 1/1966 Miyata et al.

FOREIGN PATENTS 883,936 12/1961 Great Britain.

BERNARD KONICK, *Primary Examiner.*

A. BERNARD, *Examiner.*